United States Patent
Epper

[15] 3,687,111
[45] Aug. 29, 1972

[54] STORAGE SYSTEM
[72] Inventor: Karl F. Epper, Wells, Maine
[73] Assignee: Ocean Sales, Inc., Portland, Maine
[22] Filed: April 20, 1970
[21] Appl. No.: 30,009

[52] U.S. Cl. .................................................119/2
[51] Int. Cl. ............................................A01k 61/00
[58] Field of Search ........119/2, 3, 4, 5; 62/376, 412, 62/456; 220/44 B, 20; 214/515

[56] References Cited
UNITED STATES PATENTS
2,286,146    6/1942    Look ..............................119/2

*Primary Examiner*—Hugh R. Chamblee
*Attorney*—Norman S. Blodgett

[57] ABSTRACT

This invention relates to a storage system and, more particularly, to apparatus for transporting live sea animals and the like and preserving them in their natural habitat during transit.

11 Claims, 12 Drawing Figures

PATENTED AUG 29 1972 3,687,111

KARL F. EPPER
INVENTOR.

BY
Norman S. Blodgett

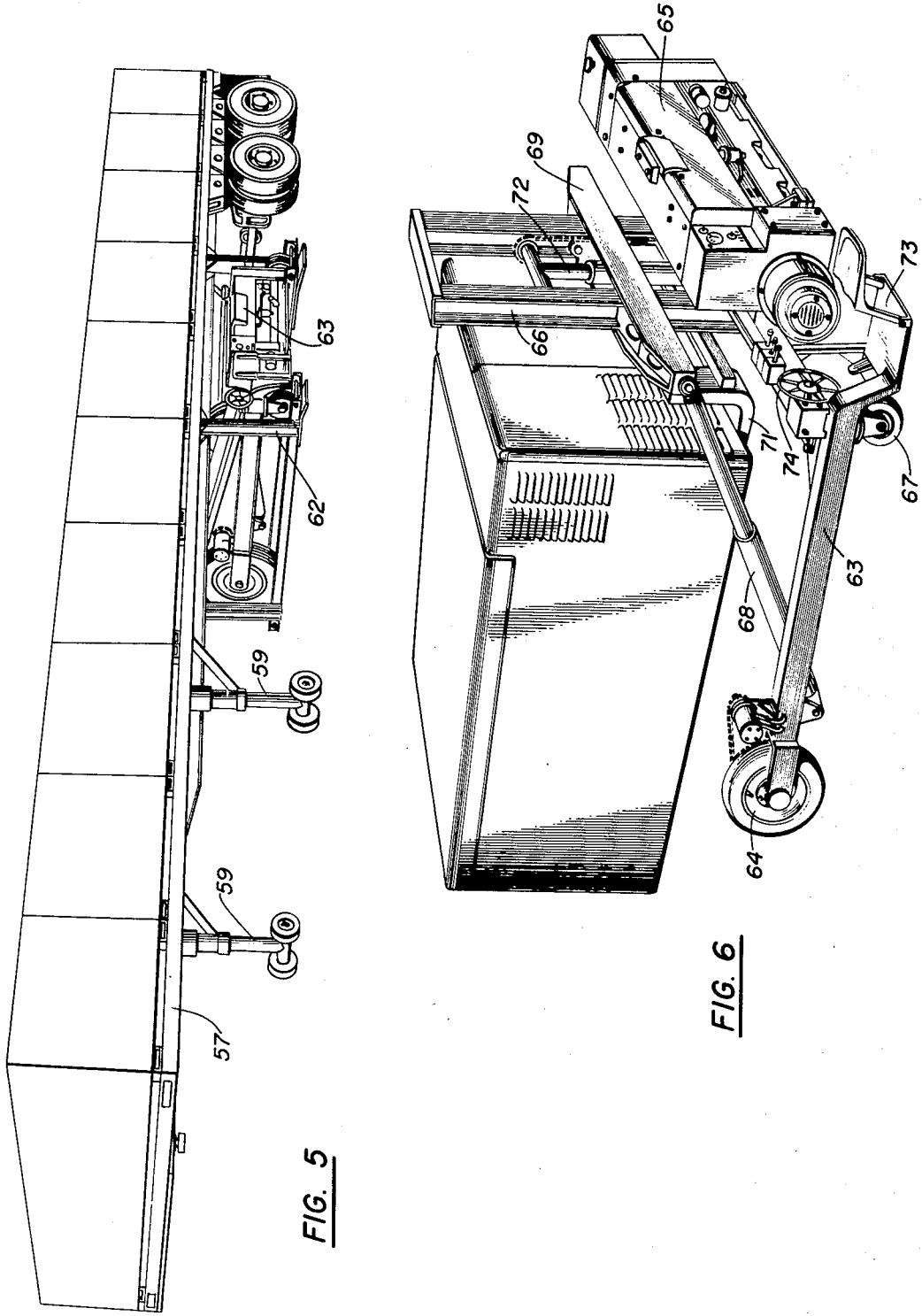

STORAGE SYSTEM

BACKGROUND OF THE INVENTION

In the business of food distribution, one of the problems that has plagued the industry has always been the transportation of sea foods, such as lobsters. It has been possible, of course, to pack them in ice and fly them from Maine to Chicago, for instance, but the lobster is then a frozen dead lobster. Purists claim that the flavor of the lobster has deteriorated in the process and that the best flavor is only possible when the lobster is alive until immediately before it is cooked. There is no doubt that all sea food deteriorates very rapidly after death and that the ideal way to transport sea animals is alive. However, lobsters, particularly, can exist only when conditions are exactly right; not only must the sea water be similar chemically to its home sea water, but the temperature and oxygen content must also be accurately maintained. On the other hand, the retailer at the point of sale is not interested in being the caretaker of an aquarium, so that the problem of maintaining the sea food in a suitable environment until it is sold is considerable. These and other difficulties experienced with the prior art devices have been obviated in a novel manner by the present invention.

It is, therefore, an outstanding object of the invention to provide a storage system for maintaining sea animals under conditions resembling their natural habitat.

Another object of this invention is the provision of a system for the transportation of sea food and its display at the point of sale.

A further object of the present invention is the provision of a storage container for live sea animals in their own sea water with self-carried means for maintaining the temperature and oxygen content at pre-selected values.

It is another object of the instant invention to provide a storage chest for sea food in sea water wherein the closure is air tight, but means is provided to change the air without loss of water.

A still further object of the invention is the provision of a storage container for sea water wherein means is provided to inhibit the movement of the water during transportation.

It is a further object of the invention to provide a storage container formed inexpensively of insulating foamed plastic so as to be air and water tight.

Another object of the present invention is the provision of a storage container for carrying sea food in sea water, wherein means is provided to remove foreign matter from the water as it develops.

A further object is to provide a transportation system for live sea food in sea water, wherein a trailer loaded with individually-controlled containers has its own apparatus for providing operating electrical current and self-propelled apparatus for moving the containers from the trailer to a point of retail sale.

With these and other objects in view, as will be apparent to those skilled in the art, the invention resides in the combination of parts set forth in the specification and covered by the claims appended hereto.

SUMMARY OF THE INVENTION

In general, the present invention consists of a storage container for sea food and the like having a container to receive the sea food and sea water with a water-tight cover and having a compartment attached to the container containing apparatus for maintaining the water at a predetermined temperature. Means is provided to change the air in the container without loss of water. The container is used with a trailer having a source of electrical current for operating the temperature-control apparatus and having a self-propelled truck for moving the containers from the trailer to the point of sale.

More specifically, the water is circulated from the bottom of the container, through the compartment, and reintroduced into the container at the top in the form of a waterfall, so that air is absorbed. A grid extending downwardly from the cover serves to inhibit movement of the water within the container.

BRIEF DESCRIPTION OF THE DRAWINGS

The character of the invention, however, may be best understood by reference to one of its structural forms, as illustrated by the accompanying drawings, in which:

FIG. 5 is a perspective view of a transportation system using the storage system, FIG. 6 is a perspective view of a self-propelled device for handling the storage system.

DESCRIPTION OF THE PREFERRED EMBODIMENT

Figure 1:
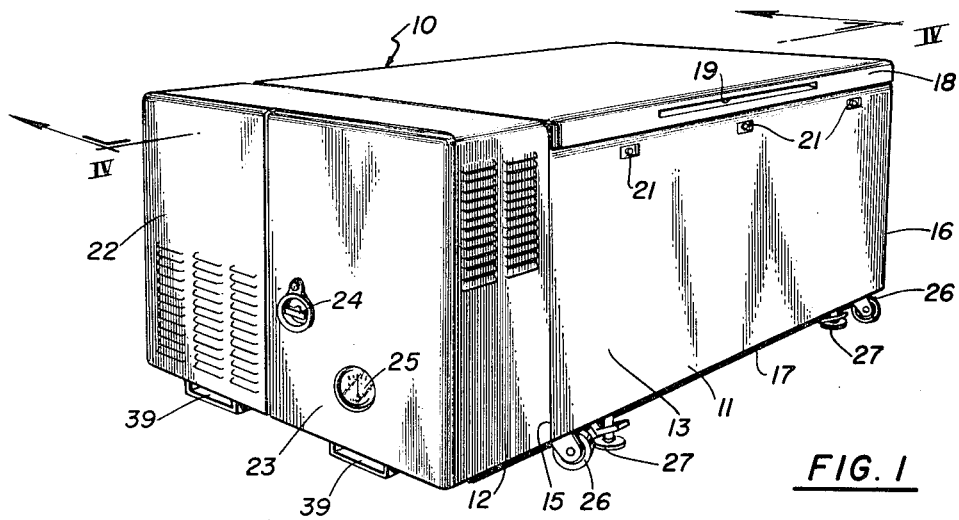
FIG. 1 is a perspective view of a storage system embodying the principles of the present invention.

Referring first to FIG. 1, wherein are best shown the general features of the invention, the storage system, indicated generally by the reference numeral 10, is shown as consisting of two parts, i.e., a container 11 and a control compartment 12. The container has a front wall 13, a rear wall 14, end walls 15 and 16, and a bottom wall 17. It is adapted to receive live sea animals, such as lobster, in sea water. A water-tight cover 18 is hingedly attached to the upper edge of the rear wall 14. The compartment 12 is detachably attached to the end wall 15 of the container and within the compartment is mounted apparatus to maintain the temperature of the water at a predetermined temperature.

The forward edge of the cover is provided with a handhole 19. The front wall 13 of the container is provided with three locks 21 which are operable by a distinctive key; the locks are of the cam type which pull the cover 18 tightly down on the upper edges of the front, rear, and side walls of the container, thus rendering it water-and air-tight.

The compartment 12 is provided with two access doors 22 and 23 held in place by a recessed latch 24. A temperature gauge 25 is mounted on the door 23. A caster wheel 26 is mounted adjacent each corner of the container and beside each wheel is mounted a retractable leg 27. The compartment 12 is suitably louvered to allow air to enter.

Figure 2:
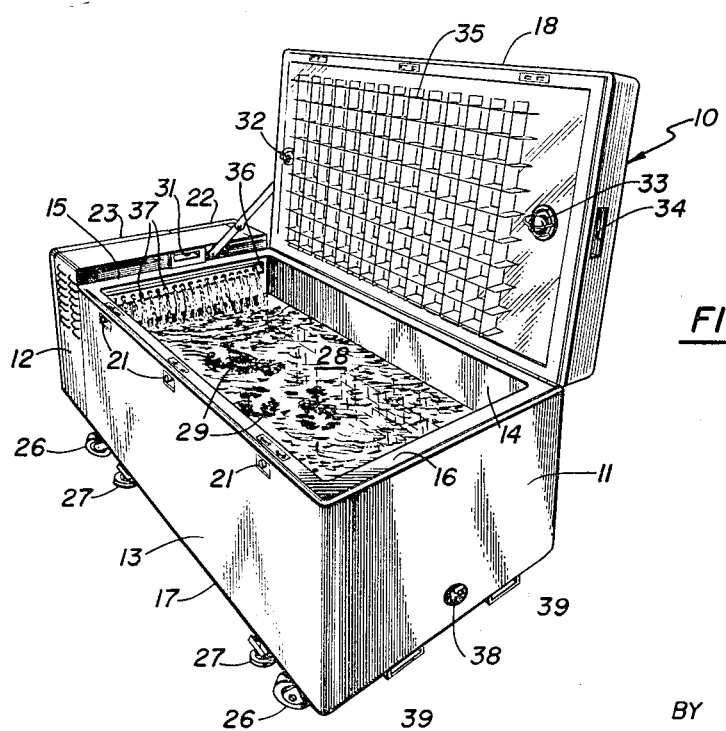
FIG. 2 is a perspective view of the system with the container cover in open position.

In FIG. 2 is can be seen that the lifting of the cover reveals the presence in the container of a body 28 of sea water containing lobsters 29. Located on the end wall of the container is an air passage 31. At one end of the undersurface of the cover 18 is located an opening provided with a check-valve 32, and at the other end is located an opening having a check-valve 33. A passage 34 opens on the end of the cover and communicates with the valve 33. Also mounted on the inner surface of the cover is a grid 35 in the form of a cell-like configuration of strips of plastic. Mounted on the inner surface of the end wall 15 is a box-like manifold 36 having a row of apertures 37 from which flow streams of the sea water. The end wall 16 is provided with a drain valve 38. Loops 39 are provided on the underside of the compartment and container to permit it to be lashed to a trailer.

Figure 3:
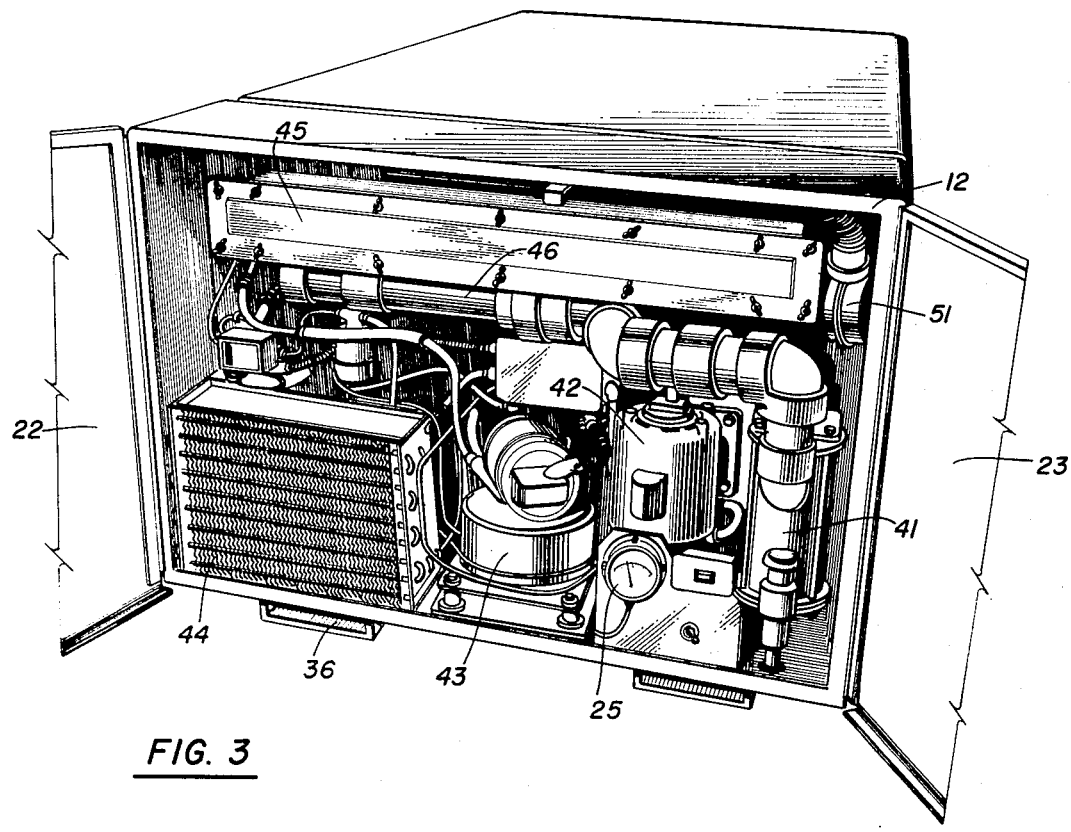
FIG. 3 is an end view of the system with compartment doors in open condition.

In FIG. 3 can be seen the various elements of apparatus in the compartment 12. A pump 41 is driven by a motor 42. A motor-compressor unit 43 is mounted on the floor of the compartment, as is a radiator 44. Along the top of the compartment 12 is located a filter 45. A conduit 46 joins the pump 41 to the filter and contains an electric heating unit (not shown). A passage 47 leaves the container at the bottom of the end wall 15 and is connected by a conduit 48 to the inlet port of the pump 41. The output side of the filter 45 is connected by a passage 49 to the interior of the manifold 36 (see FIG. 4). A fan 51 is mounted in the compartment 12 and its discharge port is connected to the passage 31 which, in turn, discharges into a passage 52 formed in the cover 18.

Figure 4:
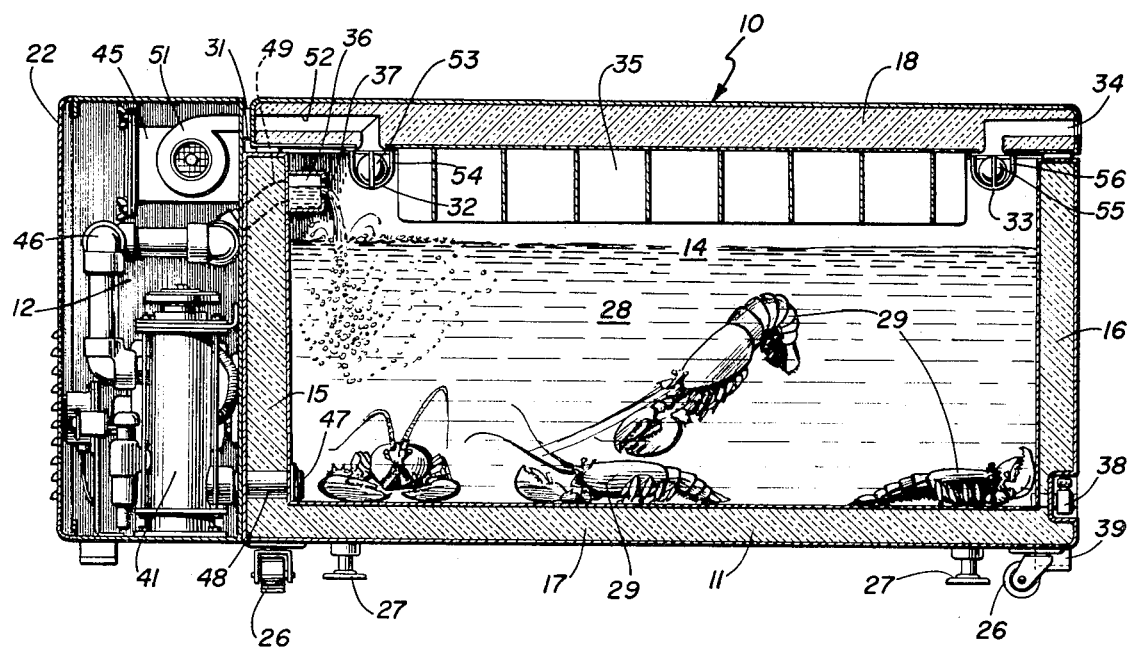
FIG. 4 is a sectional view of the system taken on the line IV—IV of FIG. 1.

As is evident in FIG. 4, the passage 52 terminated at the valve 32, which consists of a rubber flotation ball 53 which is captive in a wire cage 54. Similarly, the passage 34 terminates at the valve 33, which consists of a ball 55 in a cage 56. In both cases, the ball is larger than the passage and, when water approaches the passage, the ball rises and shuts off the entrance to the passage, thus acting as a check-valve. The cage, on the other hand, is large enough so that, in the absence of water, the ball falls away from the passage so that air can pass freely.

FIG. 5 shows a trailer 57 having rear wheels 58 and forward retractable support legs 59. The trailer has an elongated platform 61 adapted to carry a plurality of storage devices 10. A support bracket 62 extends downwardly from the underside of the platform, and in the bracket rests a self-propelled truck 63.

In FIG. 6 it can be seen that the truck is in the nature of a lift truck and has a generally U-shaped frame with a hydraulically-driven wheel 64 mounted at the end of each leg. A power plant 65 is mounted on the bight, a guide member 66 is hingedly connected there, and caster wheels 67 extend downwardly therefrom. Hydraulic cylinders 68 connect a cross member 69 of the guide member 66 to the legs of the U-shaped frame. A fork 71 is slidably carried on the guide member 66 and is actuated by a cylinder 72. An operator's platform 73 is mounted at one corner of the frame and a steering wheel 74 is also located there, as well as other control elements. The power plant 65 contains a generator which is connected to all the storage systems.

The container 11 is formed by cementing the five walls together. Each wall is a rigid slab of foamed plastic with a layer of sheet aluminum laminated to each side. After the slabs or wall s are assembled with cement between them, the assemblage is inserted into an enclosure of plastic sheet. The assemblage is placed upside-down on a large table and the sheet is placed over it and its edges are fastened to the table to make it air-tight. An evacuating pump is applied to an opening in the table under the assemblage, and when even a small evacuation of the envelope has taken place, a tremendous force takes place to pull the assemblage together. This situation is maintained until the cement has hardened. The result is a strong, air- and water-tight container.

OPERATION

The operation of the apparatus will now be readily understood in view of the above description. When connected to a source of electrical current, the motor 42 drives the pump 41. The sea water is drawn from the container through the passage 47. It passes through the pump, through the conduit 46, through the filter 45, and into the passage 49. From the passage, the water fills the manifold 36 and flows through the apertures 37. The water forms a waterfall in the form of a plurality of streams. As the water falls, air is absorbed, so that the oxygen content of the water is maintained at the natural value necessary to keep the lobsters alive. While in the conduit 46, the temperature of the water is measured. The controls set the refrigeration unit in operation, if the temperature drops above a narrow range of temperatures. If the temperature is too low, the controls cause the electrical heating unit to operate.

The fan 51 operates continuously and forces air through the passage 31, the passage 52, and the valve 32 into the space above the water in the container. Stale air is forced out of the space through the valve 33 and the passage 34 to the exterior. This assures that fresh air is available for absorption into the water as it falls through the air.

Figure 7:
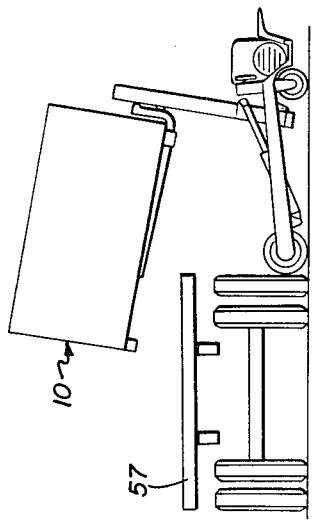
FIGS. 7 through 12 show various stages of handling of the storage system.
Figure 10:
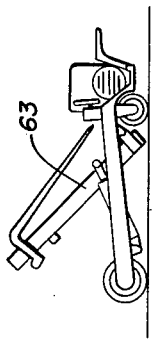
Figure 8:
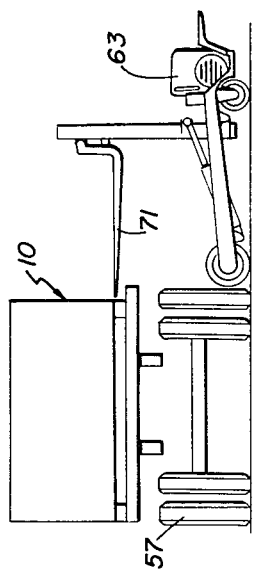
Figure 11:
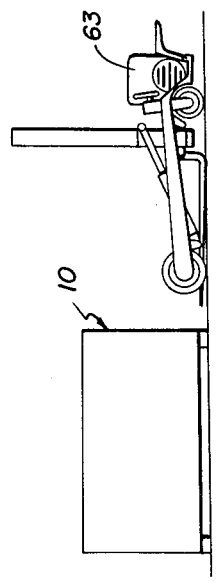
Figure 9:
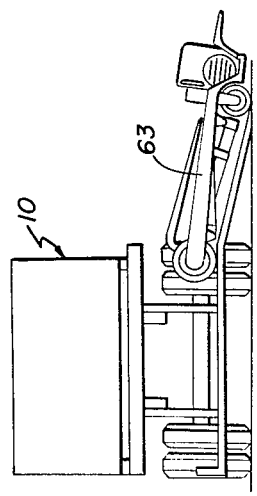
Figure 12:
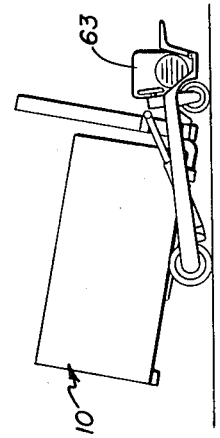

In FIG. 7, the truck 63 leaves the supporting bracket on the trailer 57 on its own ramp. FIG. 8 shows that the truck has started to lift a storage system 10 on the fork 71. In FIG. 9, the storage system has been lifted clear of the trailer. FIG. 10 shows the truck 63 carrying the storage system 10 and transporting it away from the truck. In FIG. 11, the truck has deposited the storage system at a point of sale, such as a supermarket, where it is moved into its final display position on its own wheels. At that point, the cover is lifted so that the live sea food can be seen by prospective customers. In FIG. 12, the truck 63 is moving back to the trailer, either to obtain another storage system 10, or to store itself in the bracket, so that the trailer can be moved to another retail sales outlet.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A storage system for sea food or the like, comprising:

a. a container adapted to receive the sea food and water,
b. a water-tight cover for the container, which cover, when open, exposes the entire contents of the container for viewing,
c. a compartment associated with the container and containing apparatus to maintain the temperature of the water at a pre-determined temperature, and
d. means associated with the cover to change the air in the container without loss of water, the said means consisting of a fan in the compartment connected by a first passage to the interior of the container and of a second passage from the interior of the container to the exterior, each passage being provided with a check-valve to prevent water from entering the passage.

2. A storage system as recited in claim 1, wherein the passages are located at opposite ends of the cover and extend from an edge of the cover to its underside, and wherein each valve consists of a flotation ball imprisoned in a cage surrounding the entrance of its respective passage onto the said underside of the cover.

3. A storage system as recited in claim 1, wherein the water is circulated from an outlet at the bottom of the container to an inlet at the top, and wherein the water falls freely from the inlet into the main body of water in the container and absorbs air during the fall.

4. A storage system as recited in claim 3, wherein the said inlet is provided by a manifold extending across a vertical wall of the container, the manifold being provided with a plurality of apertures to break the flow into a series of small streams to promote greater air absorption.

5. A storage system as recited in claim 1, wherein a grid is fastened to the inner surface of the cover and extends into the container to inhibit movement of the water.

6. A storage system as recited in claim 5, wherein the grid is formed of elongated strips of plastic material interlocked to form a rigid cellular structure.

7. A storage system as recited in claim 1, wherein the container is formed from a front, a rear, two end, and a bottom slab of foamed plastic cemented together into a waterproof structure.

8. A storage system as recited in claim 1, wherein the container is rectangular in horizontal cross-section and is provided on its bottom with lockable caster wheels and retractable legs.

9. A storage system as recited in claim 1, wherein the water is circulated through a filter located in the said compartment to remove foreign matter.

10. A storage system as recited in claim 1, wherein the water is circulated from the container through the compartment and is passed through a heating apparatus and a cooling apparatus, and wherein a temperature-measuring device selects the apparatus that will be operative to maintain the temperature of the water at a predetermined level.

11. A storage system as recited in claim 1, wherein the compartment is readily removable from the container for replacement by a similar compartment.

* * * * *